United States Patent [19]
Ponsford et al.

[11] Patent Number: 4,945,938
[45] Date of Patent: Aug. 7, 1990

[54] REELS AND CARRIERS THEREFOR

[75] Inventors: George L. Ponsford, Mesquite; William H. McCormick, Plano; Malcolm N. Council, Richardson; Albert W. Carroll, Dallas, all of Tex.

[73] Assignee: Otis Engineering Corporation, Dallas, Tex.

[21] Appl. No.: 410,878

[22] Filed: Sep. 22, 1989

[51] Int. Cl.⁵ .............................................. F16K 51/00
[52] U.S. Cl. .................................... 137/15; 137/355.2; 137/355.26; 242/86.2; 242/86.5 R
[58] Field of Search ............ 137/355.16, 355.2, 355.26, 137/355.27, 15, 315; 242/86, 86.2, 86.5 R

[56] References Cited

U.S. PATENT DOCUMENTS

| | | | |
|---|---|---|---|
| 989,534 | 4/1911 | MacDuffee | 242/86 |
| 2,039,250 | 4/1936 | Junge | 137/355.26 |
| 2,506,476 | 5/1950 | Brown | 242/86.2 |
| 3,116,781 | 1/1964 | Rugeley et al. | 153/54 |
| 3,116,793 | 1/1964 | McStravick | 166/21 |
| 3,150,830 | 9/1964 | Griffith | 137/355.16 |
| 3,401,749 | 9/1968 | Daniel | 166/46 |
| 3,559,905 | 2/1971 | Palynchuk | 242/54 |
| 3,614,019 | 10/1971 | Slator | 242/157.1 |
| 3,658,270 | 4/1972 | Slator et al. | 242/54 |
| 3,690,136 | 9/1972 | Slator et al. | 72/160 |
| 4,071,203 | 1/1978 | Sneed et al. | 242/86.6 |
| 4,306,682 | 12/1981 | Toussaint | 137/355.27 |
| 4,515,220 | 5/1985 | Sizer et al. | 166/384 |
| 4,625,799 | 12/1986 | McCormick et al. | 166/223 |
| 4,781,250 | 1/1988 | McCormick et al. | 166/240 |
| 4,793,417 | 12/1988 | Rumbaugh | 166/312 |
| 4,799,554 | 1/1989 | Clapp et al. | 166/312 |

Primary Examiner—A. Michael Chambers
Attorney, Agent, or Firm—Albert W. Carroll

[57] ABSTRACT

A large diameter reel having a large diameter hollow drum with a flange at each end about which a flexible elongate member, such as coil tubing, electrical conductor cable, or the like, may be wound, the reel having no shaft, but instead, having a large central opening extending therethrough, and having a gear located in the opening or on at least one or both of the reel's flanges. A carrier, such as a skid, trailer or semi-trailer, is provided with rollers for supporting the reel upon edge and with a driving gear meshable with the reel gear for rotating the reel. The trailer or semi-trailer may be provided with a hole in the bed thereof to accommodate the reel in an inset position to permit such vehicles with a reel thereon to freely pass beneath highway overpasses, and other overhangs. Methods of supporting such reels on such carriers are also provided.

14 Claims, 7 Drawing Sheets

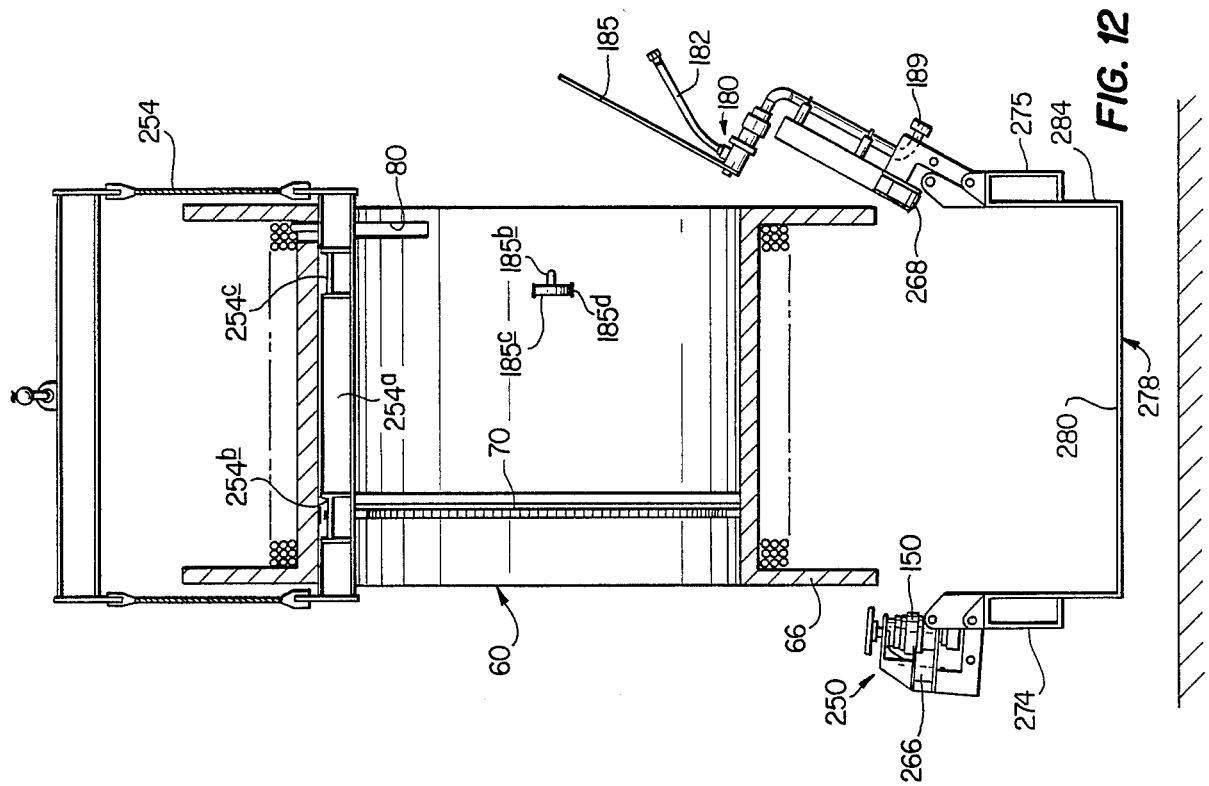
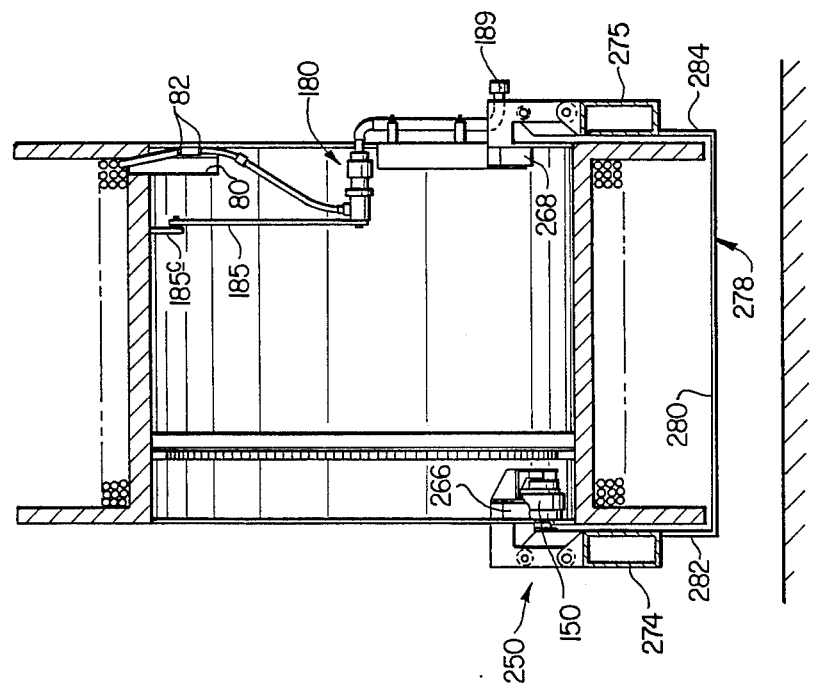

REELS AND CARRIERS THEREFOR

BACKGROUND OF THE INVENTION

1. Field of the Invention

This invention relates to reels for containing an elongate member wound thereupon, and more particularly to reels for holding a coil of flexible tubing, electrical cable, or the like. It also relates to carriers, such as skids, trucks, trailers, semi-trailers, or the like, for such reels. The invention relates also to methods for supporting such reels on such carriers.

2. Related Art and Information

For many years small pipe strings have been assembled and run into the production tubing or casing of wells, such as oil or gas wells, for such purposes as, for instance, circulating fluids therethrough in order to remove unwanted substances such as water, sand, paraffin, or the like, therefrom. Also, such pipe string was often used in other well operations such as depositing cement, chemicals or other material in the well, displacing liquids with gas, and the like, or for suspending downhole pumps, or the like equipment, or for plugging or fishing operations. Some such operations required that the pipe string make many trips into and out of the well.

Such pipe string was made up of many joints of pipe (each generally 20 to 30 feet in length) connected together by threaded couplings, sometimes called collars. Initially the pipe string was assembled from the individual joints and run into the well, but afterwards could be pulled and re-run two or three joints at a time. Even so, disassembling and re-assembling of the pipe string for each trip, was costly in labor, time, and money.

Reel tubing, also known as coil tubing, has been used for quite a number of years now, and since it is made in lengths which may be thousands of feet long, it can be forced into and pulled from a well under pressure through a stuffing box, and can be moved at several hundred feet per minute, thus greatly speeding up operations and saving much labor, time, and money.

The length of flexible tubing which can be wound upon a reel depends, understandably, upon the outside diameter of the tubing and the dimensions of the reel. Common outside diameters for flexible steel tubing are three-quarter-inch (1.905 centimeters), one-inch (2.54 centimeters), one-and-a-quarter-inch (3.175 centimeters), one-and-a-half-inch (3.810 centimeters), and now two-inch (5,080 centimeters) is available. The rigidity of the flexible steel tubing depends largely upon its outside diameter. Thus, as the outside diameter of the tubing increases, so does the minimum radius to which it may be flexed before it becomes overstressed. Therefore, larger diameter tubing must be wound around large diameter reels. So, in considering two-inch flexible steel tubing having sufficient strength to safely withstand the pressures to be encountered in the usual well servicing operations, the core of the reel must be at least 96 inches (8 feet, or 2.438 meters) in diameter. Then, the reel must have a flange at each end if a worthwhile length of such tubing is to be accommodated. Thus, a suitable reel for two-inch flexible tubing would have flanges about 144 inches (12 feet, or 3.66 meters) in diameter. Larger reels for flexible tubing will minimize bending stresses and thus prolong its useful life. If a 12-foot diameter reel is carried on the bed of a truck, it makes the load too wide if the reel is placed in the usual flat position because 12 feet wide is somewhat wider than is an ordinary highway lane. On the other hand, if the reel is stood on edge, the load becomes too tall to negotiate low overhangs such as underpasses.

There is a need in the oil field for two-inch flexible tubing and 12-foot diameter reels for holding the same. Reels of such size, if patterned after well-known reels, would be overly expensive and excessively heavy.

The same problems may be evident with large reels for electrical cable, hoses, or other elongate members.

Reels, carriers therefor, and methods of supporting them upon their carriers are illustrated and described in the following prior U.S. Pat. Nos.
3,116,781, 3,614,019, 4,071,203, 4,781,250,
3,116,793, 3,658,270, 4,515,220, 4,793,417,
3,559,905, 3,690,136, 4,625,799, 4,799,554, U.S. Pat. No. 3,116,781 which issued to R. S. Rugeley et al on Jan. 7, 1964 illustrates and describes early apparatus for forcing reeled tubing into a well. A reel 12 contains a coil of tubing. The reel is supported on a support such as a truck bed 11 by a pair of yokes 14 in which the ends of the axle 13 are engaged. The reel 12 is rotatable on its axle 13 to pay out tubing 15.

U.S. Pat. No. 3,116,793 issued also on Jan. 7, 1964 but issued to P. R. McStravick has a drawing which appears identical to that of U.S. Pat. No. 3,116,781 just discussed.

U.S. Pat. No. 3,559,905 which issued on Feb. 2, 1971 to Alexander Palynchuk discloses a reel upon which a sucker rod string is coiled. The reel rotates on an axle or pivot which may be vertical, as seen in FIGS. 1, 10, 11, and 12, or it may be horizontal as seen in FIGS. 13 and 14. The reel of FIGS. 1, 10, 11, 12 can be folded to make it narrow and, therefore quite transportable, see FIG. 10.

U.S. Pat. Nos. 3,614,019; 3,658,270; and 3,690,136 which issued on Oct. 19, 1971; Apr. 25, 1972; and Sept. 12, 1972, respectively, to Damon T. Slator, et al disclose a reel for containing reeled tubing to be injected into a well. The reel R has an axle supported in bearings 15 mounted on the upper end of posts 16, as seen in FIG. 1 of U.S. Pat. No. 3,614,019.

U.S. Pat. No. 4,071,203 which issued on Jan. 31, 1978 to Robert C. Sneed, et al discloses a reel for plastic tubing. The reel 22 (FIGS. 2-3) has an axle supported by the A-frame 34. Thus, the reel is rotatable on its axle.

U.S. Pat. No. 4,515,220 which issued to Phillip S. Sizer, Don C. Cox, and Malcolm N. Council on May 7, 1985 shows, in FIG. 1, a reel of coil tubing 70. The reel obviously pivots about its axle which has its opposite ends supported by a structure resembling an A-frame. Coil tubing 50 is payed out from the reel as the injector 60 forces it into the well 20 and is re-wound upon the reel when the injector withdraws it from the well. (The said Malcolm N. Council is a co-inventor of the present invention.)

U.S. Pat. No. 4,625,799 which issued on Dec. 2, 1986 to William H. McCormick and Charles C. Cobb shows, in FIG. 1, a reel 18 of flexible tubing 17. It appears that the reel pivots on its axle whose ends are supported by upright members attached to a skid which is supported upon the bed of truck 19. Similar showings appear in U.S. Pat. No. 4,781,250 issued to William H. McCormick, Charles C. Cobb, and Malcolm N. Council on Nov. 1, 1989; U.S. Pat. No. 4,793,417 issued to William D. Rumbaugh on Dec. 27, 1988; and U.S. Pat. No. 4,799,554 which issued to Timothy D. Clapp and William H. McCormick on Jan. 24, 1989. (The said William H. McCormick is a co-inventor of the present invention.)

There was not found in the known prior art a reel for tubing, electrical cable, or the like elongate members, having no axle or shaft on which to rotate and which had a hollow drum with a bore therethrough and a gear secured to the reel whereby it could be rotated. Neither was there found a carrier for such a reel having rollers for supporting the reel through engagement of the rollers with the rims of the flanges and having a drive gear for rotating the reel upon the carrier, nor a method for emplacing the same thereon.

The present invention is an improvement over the known reels in that it makes it possible to provide larger reels for containing long sections of elongate members, such as coil tubing, electrical cable, and the like, economically and still be transportable over the highways without exceeding desired height, width, and clearance limitations.

SUMMARY OF THE INVENTION

The present invention is directed in part toward reels for holding elongate flexible members such as flexible pipe, electrical cable, or the like, comprising a hollow cylindrical drum portion having a bore, an outwardly extending flange on either end of said drum portion, and a shaftless concentric gear secured to the reel.

The present invention is further directed to carriers for carrying or holding such reels so that they may be rotated, the carriers having rollers engageable with the outer edges of the reel flanges for supporting the reel while allowing it to be rotated, and having a drive gear engageable with the shaftless gear of the reel for rotating the same. In at least one form of the reel and carrier the reel is supported upon the drive gears or rollers which rotate it. The carrier may be in the form of a skid, or a truck, semi-trailer or trailer.

Further, the invention is directed toward methods for emplacing reels of this invention on carriers of this invention by placing their flanges in contact with rollers to be supported thereby, engaging a drive gear with the shaftless gear of the reel, and activating the drive gear for rotating the reel, or placing the reel upon drive gears or drive rollers for both supporting it and for rotating it.

It is therefore one object of this invention to provide a reel having a hollow cylindrical drum portion with a flange on each end thereof, and carrying a shaftless gear engageable with a drive gear for rotating the reel.

Another object of this invention is to provide such a reel wherein the gear is an internal gear secured to the inner wall of the hollow drum portion.

Another object is to provide such a reel wherein an internal gear is secured to or is a part of a flange of the reel.

Another object is to provide such a reel wherein an external gear is secured to or is a part of the flange of the reel.

Another object is to provide such a reel with an aperture formed through the wall of the hollow drum portion to permit the inner or proximal end of a tubing or hose or cable wound upon the reel to be passed through the aperture for connection to a source of fluid or source of electrical energy.

Another object is to provide additional rollers for maintaining the reel in position upon the carrier so that the reel flanges will remain aligned with the rollers supporting the reel.

A further object is to provide such a carrier with stabilizers engageable with the reel for preventing tilting of the reel.

Another object is to provide such a carrier with a swivel connectable to the inner end of a tubing or hose wound upon the reel for supplying fluids to the tubing or hose and for receiving fluids therefrom.

Another object is to provide such a carrier with a swivel connectable to the inner end of a tubing wound upon the reel for conducting both fluid to and from the tubing and electrical energy to and from an electrical conductor wire extending through the tubing passage.

Another object of the invention is to provide a carrier in the form of a skid, the skid having rollers for supporting the reel for rotational movement and a drive gear engageable with the reel gear for rotating the reel.

Another object is to provide such a skid-type carrier having also a swivel for connection to a tubing on a reel supported on the rollers of the skid.

A further object is to provide a carrier in the form of a trailer, semi-trailer, or truck having a bed on which are mounted support rollers for supporting a reel by engaging the rims of the flanges and a drive gear is mounted thereon for engaging the gear of the reel for rotating the reel, the carrier being further provided with alignment rollers to maintain the reel aligned with the support rollers and also provided with stabilizers for preventing tilting of the reel.

Another object is to provide a carrier of the character described which is provided with a swivel connectable with the inner end of a tubing wound upon the reel for supplying fluids thereto and receiving fluids therefrom while permitting rotation of the reel.

Another object is to provide a carrier in the form of a trailer, semi-trailer, or truck having a bed, the bed being provided with a hole in which the reel is placed with the rims of its flanges engaging rollers for supporting the reel for easy rotation, the reel flanges extending well below the surface of the bed but yet remaining sufficiently high to clear the surface of the roadway adequately.

A further object of this invention is to provide a carrier of the character described in which the drive gear, the stabilizer, and the swivel can be pivoted out of the way to permit a reel to be set in place upon or removed from the carrier.

Another object of the invention is to provide methods of supporting a reel of this invention upon a carrier of this invention with rollers supporting the reel by engaging the rims of its flanges, the alignment rollers maintaining the reel in place upon the rollers, and the stabilizers preventing tilting of the reel.

Other objects and advantages may become apparent from reading the description which follows and from studying the accompanying drawing, wherein:

DESCRIPTION OF THE DRAWING

FIG. 11 is a cross-sectional view taken along line 11—11 of FIG. 9;

FIG. 12 is a cross-sectional view like that of FIG. 11, but showing the reel being lifted from the trailer;

DESCRIPTION OF THE PREFERRED EMBODIMENTS

Figure 1:
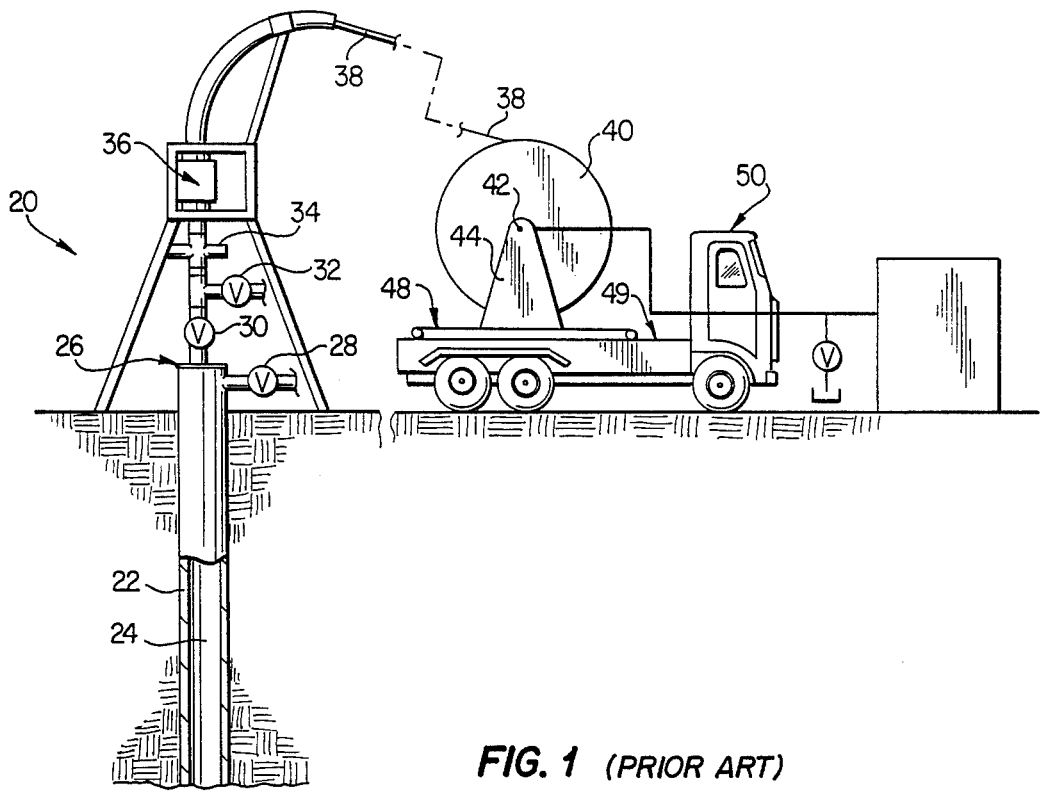
FIG. 1 is a prior art schematical view illustrating a prior art form of apparatus for installing flexible tubing in a well and removing it therefrom.

Referring now to FIG. 1, it will be seen that the well 20 is illustrated as having the usual casing 22, tubing 24, wellhead 26, casing wing valve 28, master valve 30, flow wing valve 32, and additionally, a blowout preventer 34, and coil tubing injector apparatus 36 rigged thereon. The coil tubing injector receives coil tubing 38 from a reel 40 having a central shaft 42 supported for rotational movement thereabout by upright members 44 attached to skid 48 which is carried on the bed 49 of truck 50. The reel 40 supplies the coil tubing 38 to the injector 36 as needed during movement of the coil tubing into the well, and is used to rewind the coil tubing back upon the reel as the injector removes it from the well.

The reel and carriers of this invention therefore are improvements over the reel 40 and the skid 48 seen in FIG. 1.

Figure 3:
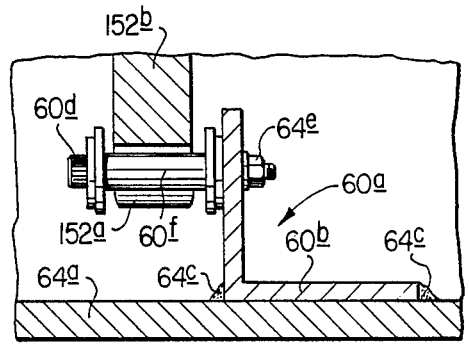
FIG. 3 is a fragmentary view showing an internal gear formed by securing roller chain parts to an angle member which is secured to the inner wall of the reel of FIG. 2.
Figure 2:
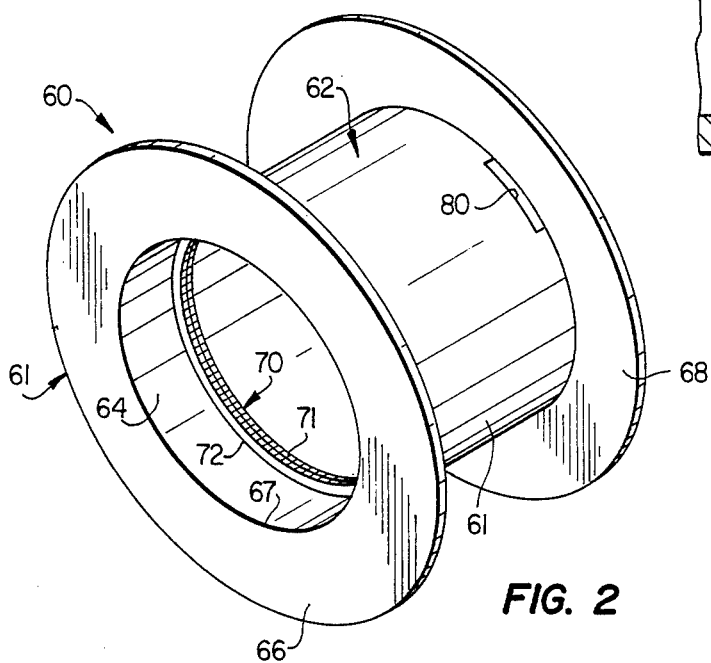
FIG. 2 is a schematical perspective view of a novel reel for holding flexible tubing, or the like elongate article.

Referring now to FIG. 2, a reel of this invention is seen to be indicated by the reference numeral 60. Reel 60, as depicted, comprises a spool 61 including a hollow cylindrical drum portion 62 having an outer surface 61 about which flexible tubing, or the like, may be wound and providing an inner wall 64. A flange 66 is attached to one end of the drum portion 62 by suitable means such as, for instance, welding as at 67, and a like flange 68 is similarly secured to the opposite end of the drum portion. An internal gear 70 having teeth 71 is secured to the inner wall 64 of spool 61 a spaced distance from the flange 66 by suitable means, such as welding as at 72. Internal gear 70 may be machined as a ring, or may be provided in the form of ring segments. Alternatively, it may be formed from roller chain parts secured to a ring member, or the like, which is then welded inside the reel as at 72, as seen in FIG. 3. In FIG. 3, the internal gear 60a is formed of an angle member 60b welded as at 64c to the inner wall 64a of the reel, and a bolt 60d secured by nut 60e to the angle supports a roller 60f engaged by the teeth 152a of the drive gear 152b. The spacing of the rollers conforms to the spacing of the teeth on the drive gear.

It is understood that the gear carried by the reel is shaftless and concentrically located thereon. It is anticipated that the gear may be located anywhere within the central opening which extends through the reel or on the face or rim of one or both of the reel's flanges. These variations will be treated later.

Reel 60 is preferably formed with a lateral aperture such as aperture 80 formed through the wall of drum portion 62 so that the proximal or bitter end of a flow conductor (tubing or hose) or electrical cable, or the like, may extend therethrough for a purpose soon to be made clear.

Reel 60 may be used with a skid-type carrier such as that seen in FIGS. 4–7 and indicated generally by the reference numeral 100. The carrier 100 comprises a rectangular frame 102 which includes a runner at opposite sides, as at 104 and 106, with cross members at its ends, as at 108 and 110, and with two additional cross members spaced inwardly therefrom, as at 112 and 114.

The runners 104 and 106 are suitably shaped at their ends so that they will be guided over rough places as the carrier is skidded over rough surfaces such as the surface of a truck bed, shop floor, a well platform, a boat, or barge deck.

Support means are provided for supporting a reel such as reel 60. It is seen that a roller assembly is attached at each of the four corners of the frame, and such roller assemblies are identified by reference numerals 120, 122, 124, and 126. Each such roller assembly includes first and second spaced-apart rollers which are in a common plane. Thus, roller assembly 120 has first and second spaced-apart rollers, as at 128, 129 mounted for limited pivotal movement upon arm 120a by pivot pin 120b on arm 120c. Also, roller assembly 120 includes a third roller, as at 132 mounted on the end of arm 120c and which rotates in a plane approximately perpendicular to the plane in which the other two rollers 128, 129 rotate.

The other roller assemblies 122, 124, 126, are correspondingly arranged.

When a reel such as reel 60 is loaded into the carrier 100, it is positioned so that one of its flanges, say flange 68 is engaged by the two rollers 128, 129 of roller assembly 120 and, similarly, by the two corresponding rollers of roller assembly 122. Thus positioned, flange 66 of the reel will rest upon the corresponding rollers of roller assemblies 124, 126. With the reel thus positioned, the flange 68 of the reel will be engaged, or nearly engaged, by the third roller 132 of roller assembly 120, and the corresponding third roller of roller assembly 122 will be correspondingly positioned with respect to flange 68. In like manner, flange 66 of the reel will be likewise positioned with respect to rollers of roller assemblies 124, 126.

It is now readily seen that the reel is supported upon the rollers, the first and second rollers of the roller assemblies bearing the weight of the reel and the third roller of the roller assemblies confining the reel to maintain the flanges thereof aligned with the first and second rollers. It is now clear that the reel is free to rotate about its longitudinal axis.

Carrier 100 is provided with means for driving reel 60 as well as means for stabilizing the reel in its normal position. In addition, the carrier 100 is provided with swivel means which will soon be described.

The drive means includes a motor, such as the reversible hydraulic motor 150 having a gear 152 which is engageable with the internal gear 70 of the reel 60. Motor 150 is powered by fluid pressure, but a motor powered by electricity could be used, as desired. In oilfield use, it would be preferable generally to power the motor by fluid pressure, especially since coil tubing injectors are usually powered by fluid pressure. Motor 150 is mounted upon a swingable member 154 which is pivotally connected to runner 104 by suitable hinge means as at 156. The motor 150 can be readily pivoted into a position wherein its gear 152 will mesh with the reel gear. When in this proper drive position, a bolt or pull pin 158 (FIG. 5) passing through holes 160 in the swingable member 154, secured to runner 104, and holes 162 in an upright member 164 fixed as by welding to runner 106. Pull pins 158 are preferably captured by chains 158a as shown in FIG. 5.

Figures 4, 5:
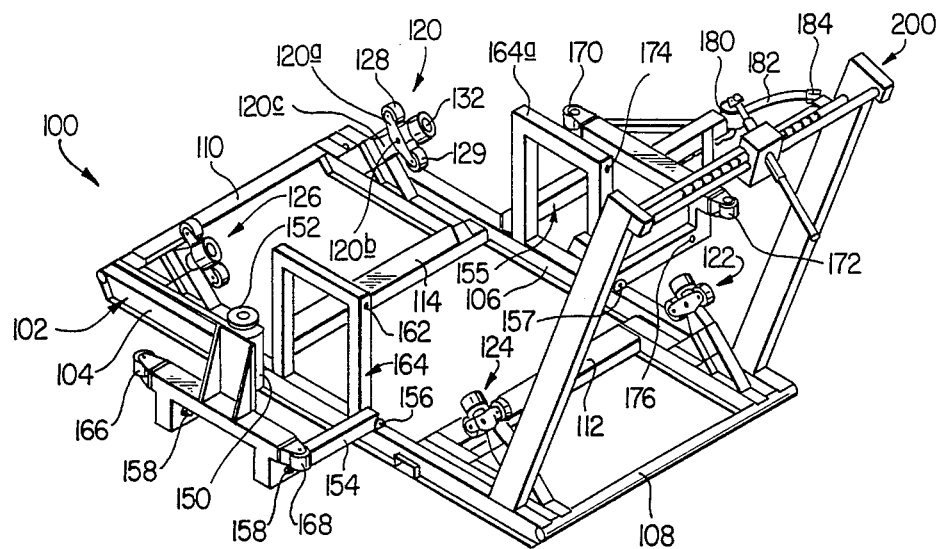
FIG. 4 is a schematical perspective view of a novel skid-type carrier for reels such as the reel of FIG. 2.
FIG. 5 is a schematical side view of the skid-type carrier of FIG. 4 with the reel of FIG. 2 in place thereon.
Figure 6:
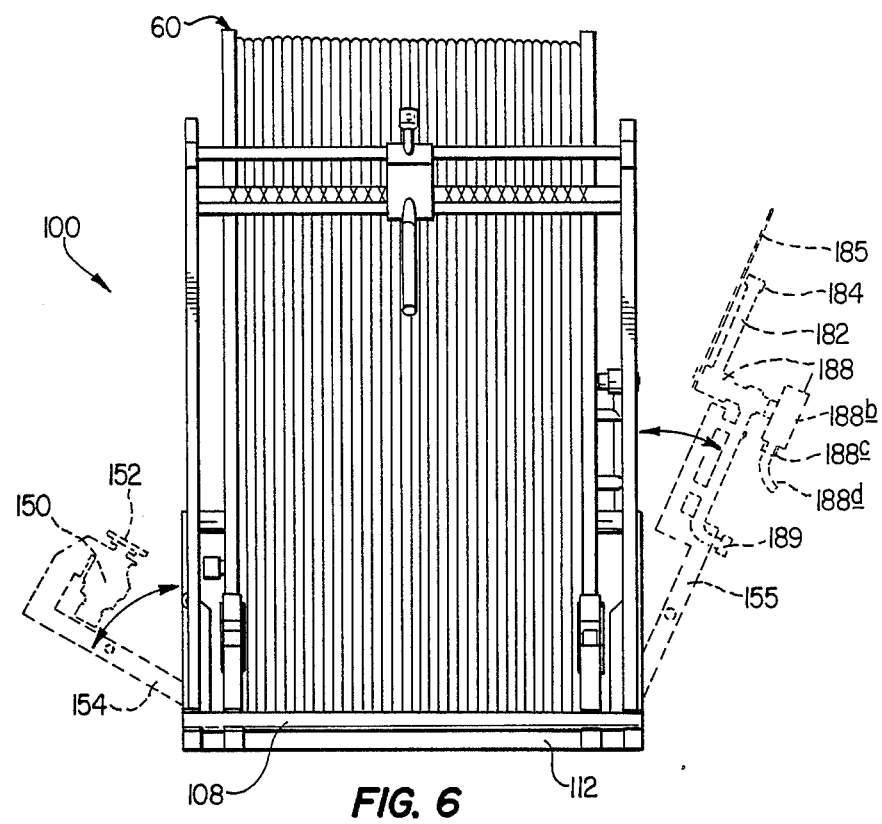
FIG. 6 is an end view of the loaded skid-type carrier of FIG. 5.
Figure 7:
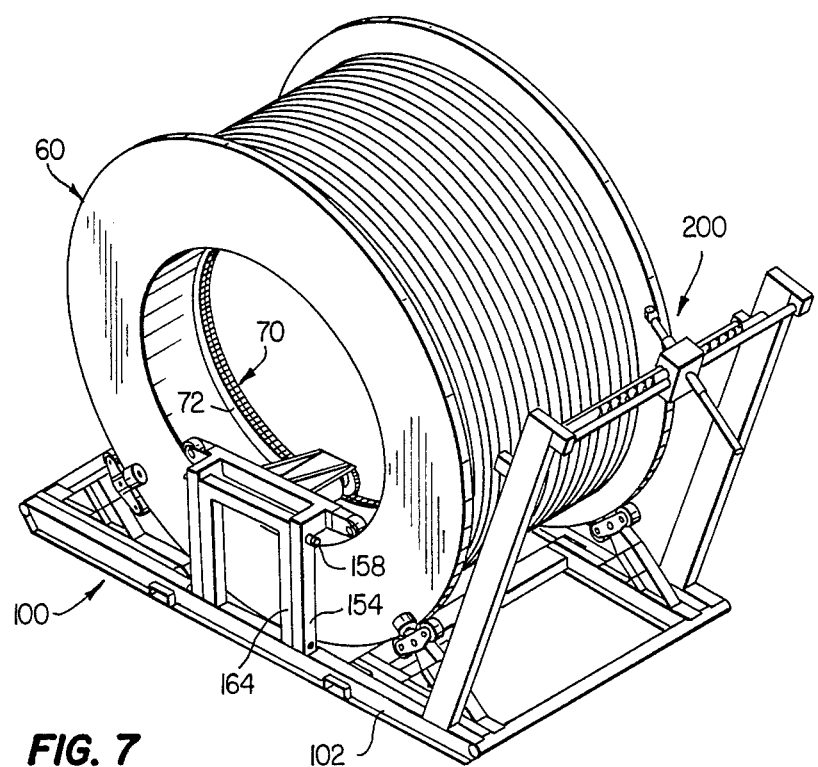
FIG. 7 is a perspective view of the loaded skid-type carrier of FIG. 5.

The swingable member 154 carries a pair of rollers, as at 166 and 168 for engaging, or almost engaging the inner wall 64 of reel 60 as seen in FIG. 5, when the motor is in driving position, to prevent the reel from tilting and breaking contact with any of its support rollers.

Similarly, the carrier 100 is provided with an upright member 164a which is like upright member 164 but is secured to runner 106 on the opposite side of the carrier. Also, a swingable member 155 is hingedly connected as at 157 to the frame 106. The swingable member carries a pair of rollers 170 and 172, as shown in FIG. 4 for cooperating with the inner wall 64 of reel 60 to prevent the reel from tilting and breaking contact with the rollers on that side of the carrier 100. Swingable member 155, after being swung to vertical position is secured in place by a lock member, like that of 158, engaged in aligned holes 174, 176 of the upright member and the swingable member.

Figure 9:
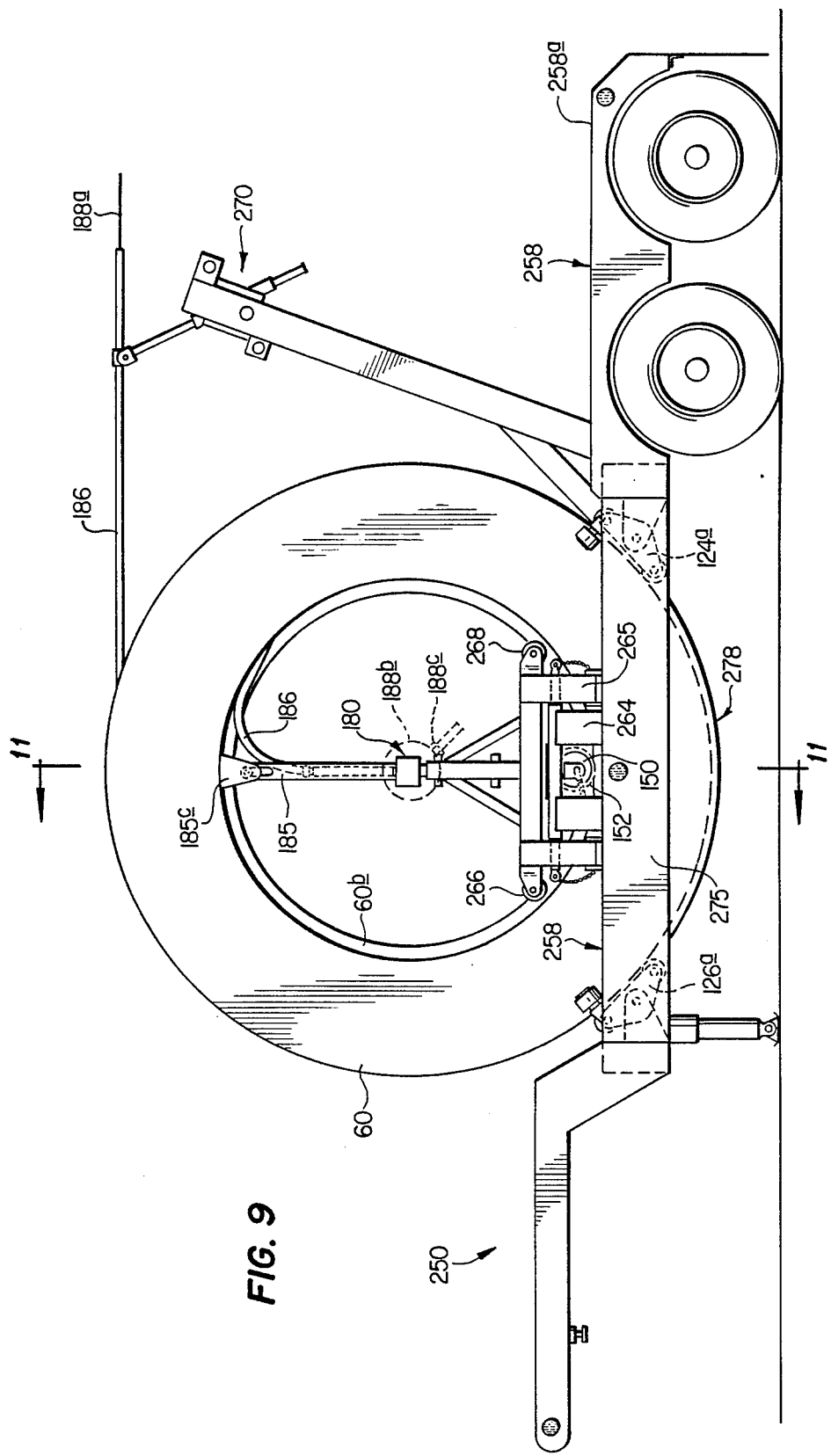
FIG. 9 is a schematical side view of the loaded semi-trailer type carrier of FIG. 8 showing the coil tubing extending through the level-wind mechanism.

The swingable member 155 (see FIG. 5) carries at its upper end a swivel means 180 having a rotatable portion 188 having an arm 182 connectable as at 184 to a flexible member 186, or the like, extending through aperture 80 in the drum portion 62 of reel 60. A torque arm 185 is connected to the rotatable portion 188 also and extends outwardly therefrom. Near the outer end of this torque arm a hole or slot 185a is provided in which a finger 185b carried on bracket 185c is engaged. Bracket 185c is secured to the inner wall of the reel as by welding as at 185d (as seen in FIGS. 9, 11, and 12). This torque arm is rotated about the swivel by the reel and, thus, prevents stressing the bitter end of the tubing or cable carried on the reel. A source of pressurized fluid (not shown) is connectable to the swivel means 180 by means of connection 189 seen in FIGS. 6, 11, and 12. The swivel 180 may supply fluids or electricity, or both, to the flow conductor or electrical conductor wound about the reel.

In some cases electrical conductor such as an insulated wire 188a (FIG. 5) may extend through the entire length of the flexible tubing and extend outwardly from both ends thereof. Thus, electrical tools or instruments can be carried into the well on the end of the flexible tubing making it possible to carry out operations requiring electrical devices and/or hydraulic devices, plus operations requiring the pumping or circulation of fluids or well treating liquids. In this case, the swivel must include an electrical commutator mechanism in addition to the usual fluid tight swivel mechanism. Such commutator mechanism is shown in dotted lines if FIGS. 5, 6, 9, and 10 where it is identified by the reference numeral 188b. This commutator includes an electrical connection 188c for receiving one end of an electrical cable 188d having its opposite end connectable to a source of suitable electrical power (not shown).

It is recommended that the reel 60 be provided with means near its aperture 80 for clamping or otherwise securing the end portion of the flexible member, wound upon the reel, which extends through the aperture to maintain it connected to the reel and prevent it becoming disconnected therefrom. Such means is represented in FIG. 11 where it is indicated by the reference numeral 82.

The carrier 100 is also provided with level wind means 200 for controlling the wraps of the flexible tubing, cable, or the like as it is coiled upon the reel 60 in the well-known manner.

The skid-type carrier 100 is useful at the operations base for winding flexible tubing, cable, or the like, thereon or for removing the same therefrom, as desired. It is also useful for platform operations where the wells are located offshore. However, it may be desirable to provide carriers such as carrier 100 for use on wells and provide similar carriers for use at the operating base on which the swivel has been omitted since it will not be needed there and would likely be in the way and, in addition, be an unnecessary expense.

Figure 8:
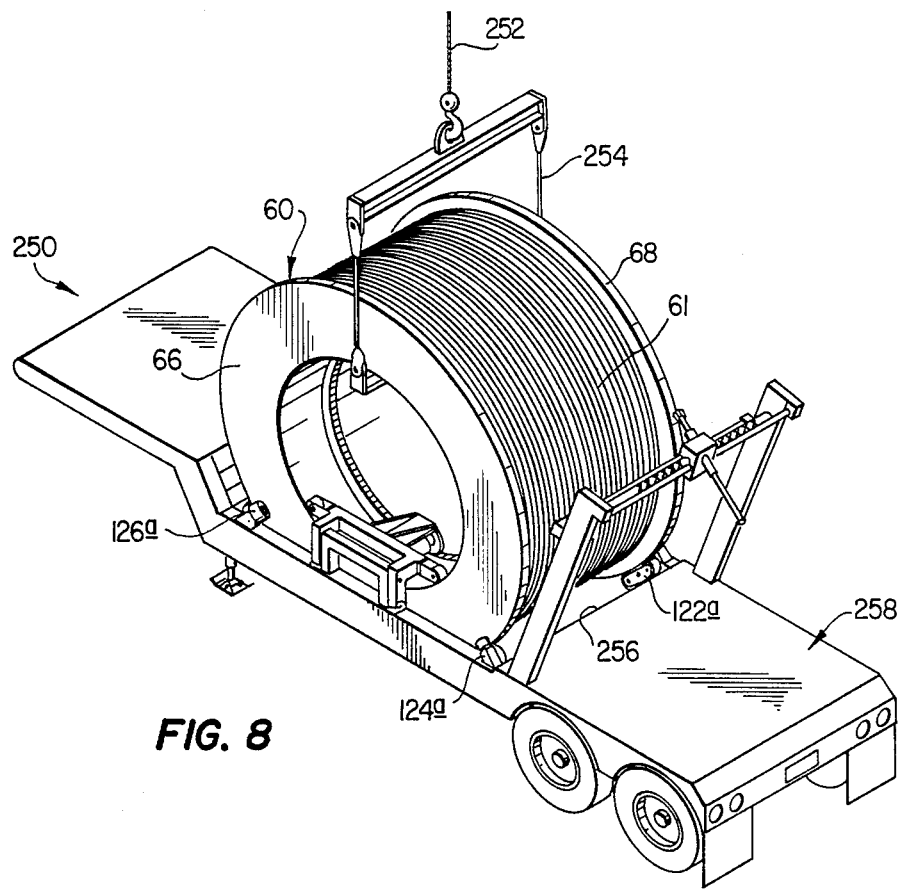
FIG. 8 is a schematical perspective view of a semi-trailer type carrier upon which a loaded reel has just been set in place.
Figure 10:
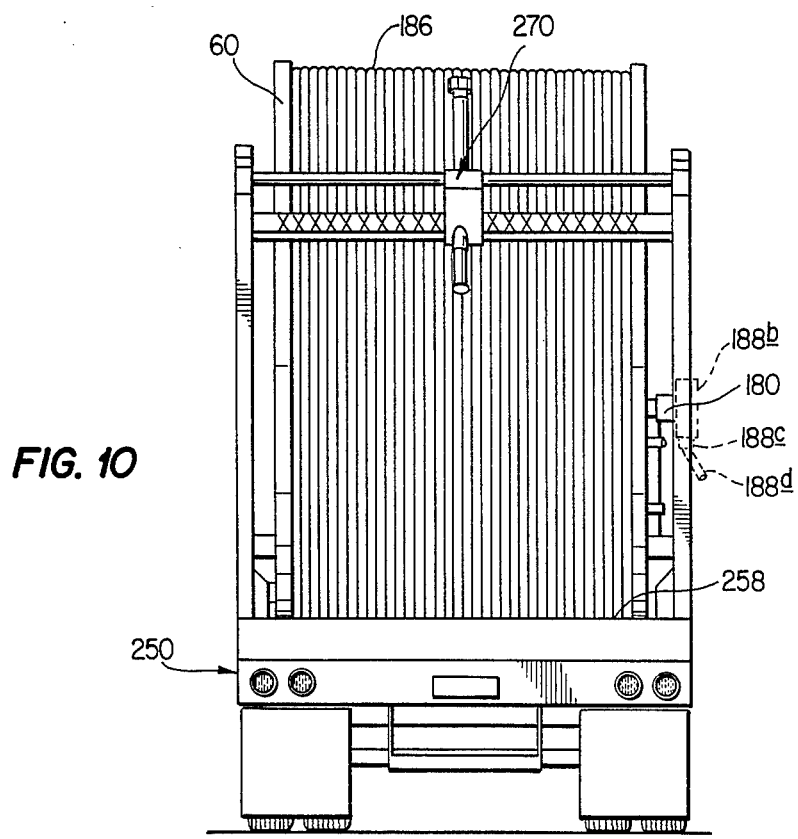
FIG. 10 is a rear end view of the loaded semi-trailer of FIG. 8.

Referring now to FIGS. 8-12, it will be seen in FIG. 8 that a reel 60 loaded with coil tubing 61 is in the process of being placed on a carrier which, in this instance, is in the form of a trailer 250. A hoist (not shown) having a cable 252 hooked onto a special sling 254 for handling reels such as reel 60, has just lowered a loaded reel onto semi-trailer carrier 250 and is ready to be released from the reel. As clearly seen in FIG. 8, the reel 60 sets in a rectangular hole or opening 256 in the bed 258 of the trailer, where it is supported by its flanges 66 and 68 resting upon 4 roller assemblies such as the four follow assemblies 120, 122, 124, and 126 mounted upon the skid-type carrier 100 previously described. The four roller assemblies on the trailer may be identified by the same reference numerals but with an "a" added to each of them. Roller assemblies 122a, 124a, and 126a can be seen mounted in the corner regions of rectangular opening 256. Roller assembly 120a is at the far corner of the opening and is hidden by the reel. These roller assemblies may be exactly like those mounted on the skid-type carrier and they perform the same task in the same manner. That is, they support the reel by its flanges so that it is free to be rotated. The third roller in each roller assembly maintains the reel in position with its flanges aligned with the support rollers.

As is seen in FIG. 9, the reel 60, while in position with its flanges resting upon roller assemblies such as 124a and 126a, has its loWer extent somewhat below the surface 258a of the trailer bed 258, but clears the surface of the roadway therebeneath adequately.

Semi-trailer 250 is provided with a drive motor 150 and drive gear 152 which may be exactly like the drive motor 150 and drive gear 152 the skid-type carrier of FIG. 4, and likewise is provided with a swivel assembly 180. It is noticed, however, that the upright member 264 on the semi-trailer 250 need not be as tall as upright member 164 on the skid-type carrier because the reel sets much lower on the semi-trailer because it extends through the opening 256 in the bed 258 while the reel on the skid-type carrier cannot set very low since the runners are at ground level.

The swingable member 265, likewise is not so tall on the trailer 250 but is provided with stabilizing rollers 266 and 268, which may be exactly like rollers 166 and 168 of the skid-type carrier 100. The swivel 180 on the trailer 250 may be exactly like swivel 180 on the skid-type carrier.

Further, the trailer 250 is provided with a level-wind assembly 270 which may be exactly like the level-wind assembly 200 on the skid-type carrier.

The rectangular hole in the bed 258 of the trailer 250 may be provided by partially omitting the floor 258a, as shown, so that its spaced-apart beams 274 and 275 (see the cross-sectional views of FIGS. 11 and 12) are exposed sufficiently to provide the hole of adequate dimensions. A drip pan 278 having a bottom 280 and sides 282 and 284 (see FIGS. 9, 11, and 12) is secured in the position shown to close the hole 256 beneath the beams and to be in position to catch oil and the like which may drip from the coil tubing or otherwise fall into the drip pan.

In FIG. 11 the reel 60 is shown in operating position, and the drive motor 150, as well as the swivel assembly 180 are likewise shown in operating position. In FIG. 12, the swivel 180 and the drive motor 150 are shown swung outward to clear the reel which has just been lifted and is suspended above the semi-trailer 250 by a hoist (not shown) through use of the special sling 254. In FIG. 12, it can be seen that the lower bar 254a of the special sling is provided with two rather generous recesses 254b and 254c for accommodating the internal gear 70 regardless of which way the bar 254a is oriented. The recesses 254b and 254c are sufficiently wide to ensure that the internal gear will be aligned with one of the recesses even when the bar is located to the extreme left or extreme right, as viewed in FIG. 12.

It is understood that should the gear be located outside the opening extending through the reel, the lower bar 254a need not be provided with recess 254b or 254c. Thus, while an internal gear has been shown fixed to the inner wall of the drum portion of the reel, the gear can take other forms and can be fixed at different locations as desired. See FIGS. 13-16.

Figure 13:
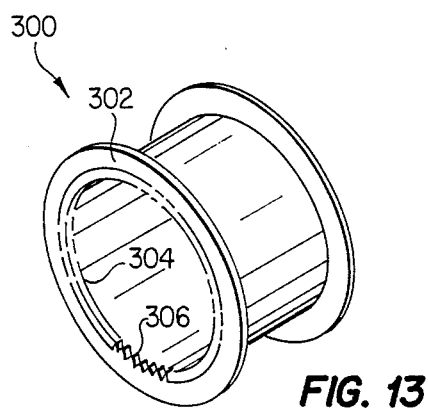
FIG. 13 is an isometric view of a reel showing an internal gear on the flange thereof.

Referring to FIG. 13, it is seen that a modified form of reel 300 has a flange 302 and an opening 304 extending through the reel. An internal gear having teeth 306, is secured by suitable means to the end of the reel and its opening approximates that of the reel. The teeth 306 may be formed on the inner edge of flange 302 if desired.

Figure 14:
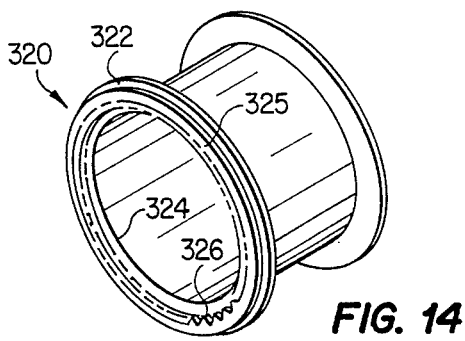
FIG. 14 is a view similar to that of FIG. 13, but showing an internal gear having an opening substantially larger than the opening through the reel.

In FIG. 14, the reel 320 has a flange 322 and an opening 324 extending through the reel. A large internal gear 325 having internal teeth 326 is fixed by suitable means such as by bolts or welds to the flange.

Figure 15:
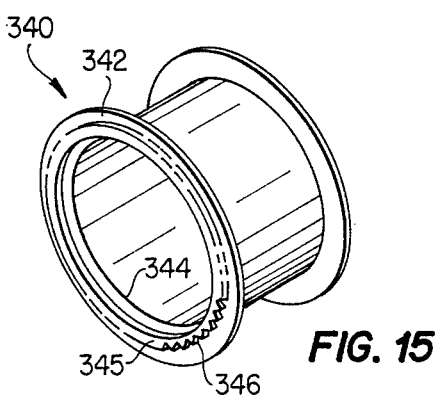
FIG. 15 is a view similar to that of FIG. 13, but showing an external gear on the flange of the reel.

In FIG. 15, the reel 340 has a flange 342 and an opening 344 extending through the reel. An external gear 345 having teeth 346 is fixed by suitable means such as bolts or welds to the flange.

Figure 16:
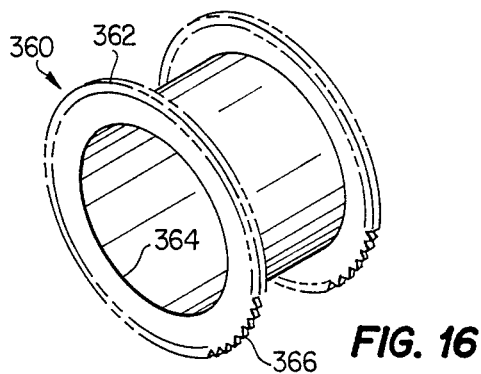
FIG. 16 is an isometric view of a reel showing external gear teeth located on the rim of the reel's flange.

Then, in FIG. 16, the reel 360 is shown to have a flange 362 and an opening 364 extending through the reel. Gear teeth 366 are carried on the rim of the reel as shown. The gear teeth 364 may be formed integral with the flange, or may be formed on a tire, or the like, and secured to the rim of the flange as desired.

Further, if desired the drive gears which mesh with gear 364 on the rim of flange 342 of reel 340 could also support the reel.

Figure 17:
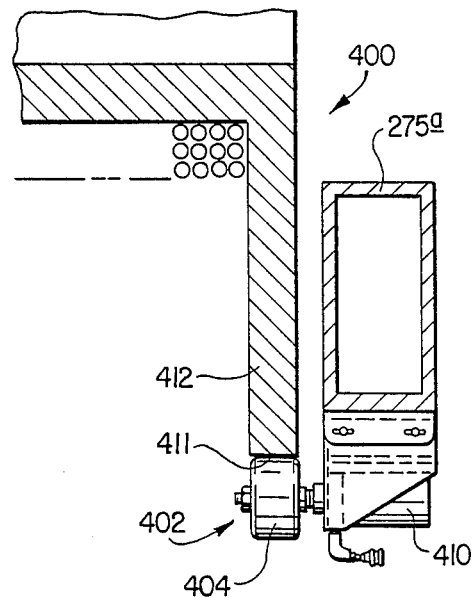
FIG. 17 is an enlarged fragmentary view showing a reel supported on and driven by rollers powered by suitable motor means.

Alternatively, a reel such as reel 400, seen in FIG. 17, may be provided with no gear, but may be supported upon rollers such as roller 402 having a tire 404 engaged by the rim 411 of the flange 412. Such rollers could be powered by a motor such as motor 410 mounted on the beam 275a which may be exactly like beam 275 of FIGS. 11-12.

It is understood that the foregoing description includes methods emplacing reels of this invention on carriers of this invention. Such methods include the steps of placing a reel on a carrier such as a semi-trailer or trailer having a bed with a hole therein; supporting the reel on rollers engaging the rims of the reel's flanges; moving stabilizing rollers to position for preventing tilting of the reel; engaging drive means of said carrier with gear means on the reel; and operating the drive means to rotate the reel.

Further method steps include, connecting swivel means on the carrier with the bitter end of the conductor (fluid conductor or electrical conductor) wound on the reel, and to a source of fluid pressure or electrical energy; and supplying pressurized fluid or electrical current to the flow conductor or electrical conductor through the swivel means.

Further the methods include the steps of disengaging the drive means, stabilizing means, and disconnecting the swivel means; and lifting the reel out of the hole in the carrier and away from the carrier.

The foregoing description and drawings of the invention are explanatory and illustrative only, and various changes in sizes, shapes, and arrangement of parts, as well as certain details of the illustrated construction, or similar changes in the systems or methods, may be made within the scope of the appended claims without departing from the true spirit of the invention.

We claim:

1. The method of emplacing a reel on a carrier such as a trailer, semi-trailer, skid, or the like, for rotational movement, said reel having a drum portion with a flange fixed to each end thereof, an axial opening extending through said reel, and gear means carried on said reel, said carrier having a bed, said bed having an opening therein for receiving a portion of said flanges of said reel, said carrier having support roller means including first roller means for engaging the outer edges of said flanges for supporting said reel, second roller means for stabilizing said reel upon said first roller means, and drive means including a driving gear mounted thereon for rotating said reel, said method including the steps of:
   (a) placing said reel on said carrier with a portion of its flanges entering said opening;
   (b) supporting said reel in said opening with the outer edges of its flanges resting upon said first roller means;
   (c) moving said stabilizing means to a position wherein said second roller means thereof is disposed within said axial opening of said reel to prevent said reel from tilting;
   (d) engaging said drive gear with said gear means of said reel;
   (e) operating said drive means to rotate said reel;

(f) disengaging said stabilizing means and said drive means from said reel; and (g) lifting said reel out of said bed opening and away from said carrier.

2. The method of claim 1 wherein said reel carries a flexible tube such as a coil tubing, or the like, having a fluid passage therethrough, and said trailer is provided with swivel means for connecting to the end portion of said tube for conducting fluids thereto or therefrom, said method including the additional steps of:

(a) connecting said swivel means to the bitter end of said tube and to a source of fluid pressure; and (b) supplying pressurized fluid to or receiving fluid from said tube through said swivel means.

3. The method of claim 2, wherein said tube has an electrical conductor wire disposed in said fluid passage of said tube, and said swivel is adapted to conduct electrical current to and from said electrical conductor wire in said tube, said method including the further steps of:

(a) connecting said swivel means to the end portion of said electrical conductor wire; and (b) conducting electrical current to or from said electrical conductor wire.

4. The method of claim 3, including the further steps of:

(a) disengaging said stabilizing means, and said drive means;

(b) disconnecting said swivel from said tube and from said electrical conductor wire; and (c) lifting said reel out of said bed opening and away from said carrier.

5. A carrier for receiving a reel, said reel having a hollow drum portion with a flange secured to each of its opposite ends, an axial opening extending through said reel, and gear means secured to said reel in concentric relation with said axial opening, said reel further including a bracket attached thereto, said carrier comprising:

(a) body means;

(b) roller means on said body for non-concentrically engaging and supporting said reel when placed thereon; and (c) swivel means on said body, including:
  (i) first attachment means for connection to a source of pressurized fluid,
  (ii) second attachment means for connection to a flexible tubing or hose carried on said reel, and
  (iii) swivel means between said first and second attachment means allowing rotation of said reel while pressurized fluids are being conducted to or from said flexible tubing or hose; and (d) torque arm means extending from said swivel and having its outer end connectable to said bracket provided on said reel whereby rotation of the reel produces rotation of the rotating portion of the swivel means; and (e) drive means on said body, including drive gear means engageable with said gear means on said reel for rotating said reel.

6. The carrier of claim 5, wherein said support means, said swivel means and said drive means are swingably mounted on said body means and are swingable aside to permit a reel to be set in place on said body means or removed therefrom.

7. The carrier of claim 6, wherein said swivel means includes:

(a) commutator means on said swivel means, including:

(i) first electrical connection means connectable to a source of electrical energy, (ii) second electrical connection means connectable to an end portion of an electrical conductor wound on said reel, and (iii) commutator means between said first and second electrical connection means allowing rotation of said reel while electrical power or electrical current is present in said electrical conductor wound on said reel.

8. The device of claim 5 or 6, wherein said body means is a skid.

9. The device of claim 5 or 6, wherein said body means is a trailer or semi-trailer pullable behind a truck or tractor.

10. A reel upon which a flexible article such as a tubing, hose, cable, electrical conductor cable, or the like, may be wound, said reel comprising:

(a) a spool including:
  (i) a hollow cylindrical drum portion having a longitudinal bore therethrough,
  (ii) a pair of annular flanges, each having a central opening approximating that of said drum portion, one of said flanges secured to either end of said drum portion in concentric relation therewith,
  (iii) an aperture in the wall of said drum portion for receiving an end portion of an article to be wound upon said spool, said aperture being located adjacent the inward wall of one of said flanges;
  (iv) means near said aperture for securing said end portion of said article to said spool;

(b) gear means secured to the inner wall of said hollow drum portion intermediate the ends of said reel at a non-centered location, said gear means including an internal gear; and (c) a bracket secured in said opening through said reel and extending inwardly in substantial alignment with swivel means on a carrier when said reel is supported on said carrier, said bracket being engageable with a torque arm attached to swivel means on said carrier, whereby rotation of said reel on said carrier will cause rotational movement of said torque arm about said swivel.

11. A reel upon which a flexible article such as a tubing, hose, cable, electrical conductor cable, or the like, may be wound, said reel comprising:

(a) a spool including:
  (i) a hollow cylindrical drum portion having a longitudinal bore therethrough,
  (ii) a pair of annular flanges, each having a central opening approximating that of said drum portion, one of said flanges secured to either end of said drum portion in concentric relation therewith,
  (iii) an aperture in the wall of said drum portion for receiving an end portion of an article to be wound upon said spool, said aperture being located adjacent the inward wall of one of said flanges;
  (iv) means near said aperture for securing said end portion of said article to said spool;

(b) gear means secured to the inner wall of said hollow drum portion at one end of said reel, said gear means including an internal gear; and (c) a bracket secured in said opening through said reel and extending inwardly in substantial alignment with swivel means on a carrier when said reel is supported on said carrier, said bracket being engageable with a torque arm attached to swivel means on said carrier, whereby rotation of said reel on said carrier will cause rotational movement of said torque arm about said swivel.

12. A reel upon which a flexible article such as a tubing, hose, cable, electrical conductor cable, or the like, may be wound, said reel comprising:
   (a) a spool including:
      (i) a hollow cylindrical drum portion having a longitudinal bore therethrough,
      (ii) a pair of annular flanges, each having a central opening approximating that of said drum portion, one of said flanges secured to either end of said drum portion in concentric relation therewith,
      (iii) an aperture in the wall of said drum portion for receiving an end portion of an article to be wound upon said spool, said aperture being located adjacent the inward wall of one of said flanges;
      (iv) means near said aperture for securing said end portion of said article to said spool;
   (b) gear means secured to one of said pair of flanges and concentric therewith.

13. The reel of claim 12, wherein the gear means is an external gear.

14. The reel of claim 13, wherein said external gear means is on the rim of at least one of said flanges.

* * * * *